June 16, 1936.  C. E. KENNEDY  2,044,615
COMBINED ROLL AND FRANKFURT ELECTRIC TOASTING DEVICE
Filed June 4, 1934  2 Sheets-Sheet 1
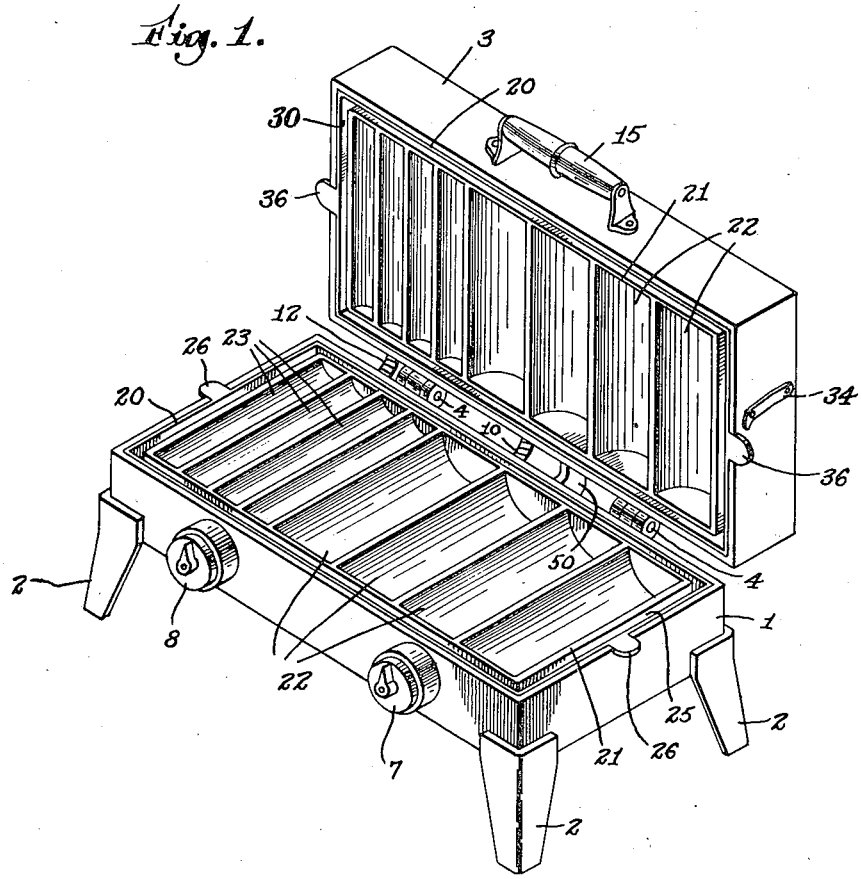
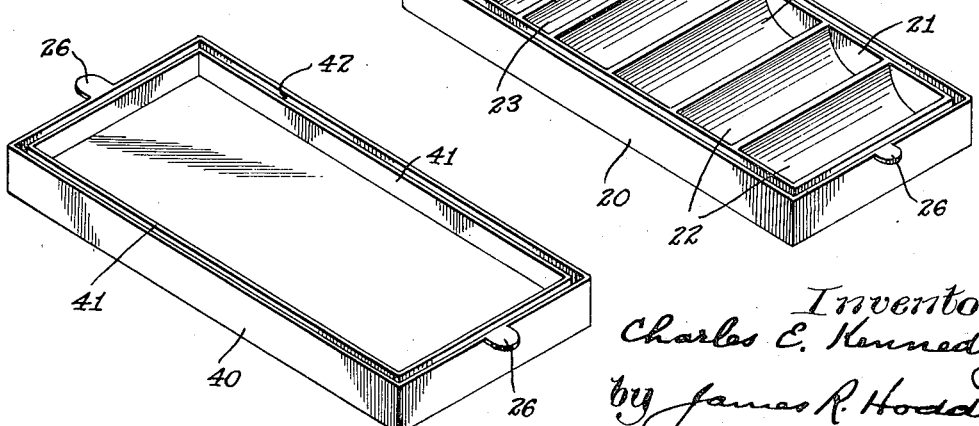

June 16, 1936.  C. E. KENNEDY  2,044,615
COMBINED ROLL AND FRANKFURT ELECTRIC TOASTING DEVICE
Filed June 4, 1934  2 Sheets-Sheet 2

Inventor
Charles E. Kennedy
by James R. Hodder
Attorney

Patented June 16, 1936

2,044,615

UNITED STATES PATENT OFFICE 2,044,615

COMBINED ROLL AND FRANKFURT ELECTRIC TOASTING DEVICE

Charles E. Kennedy, Lakeville, Mass.

Application June 4, 1934, Serial No. 728,943

1 Claim. (Cl. 219—19)

My present invention is a novel and improved form of electrical heating, roasting, or toasting apparatus particularly adapted and intended for use in toasting sausages, Frankfurts, rolls, and the like which are ordinarily sold together.

As shown in the accompanying drawings, my improved apparatus consists in electrical heating means with capacity for electrical heat in both a base and a cover member which, preferably, are hinged together and which thus effect the toasting of the contents in an even uniform manner both above and below. Also, I preferably divide the apparatus so that the same number of rolls, in which the Frankfurts will be placed, are simultaneously toasted so that they are ready to be dispensed simultaneously. Furthermore, the apparatus will maintain the articles thus toasted in heated condition after the heat is turned off.

Referring to the drawings showing preferred embodiments of the invention,

Fig. 1 is a view in perspective of my toasting apparatus particularly intended for toasting four Frankfurts and four rolls simultaneously;

Fig. 2 is a perspective view of the bottom tray portion removed;

Fig. 3 is a view of a similar tray portion adapted to receive articles other than Frankfurts, such for example as meat cakes, Hamburg, or the like;

Figure 4:
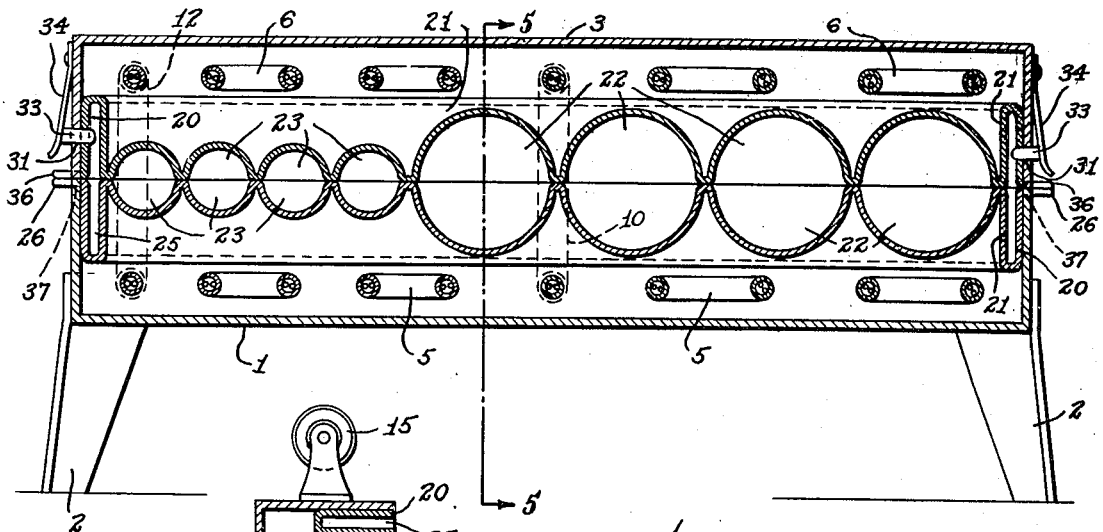
Fig. 4 is a cross-sectional view on an enlarged scale showing the cover closed.

My present apparatus may be conveniently made in a compact form suitable for portable use, such as roadside stands, and for this purpose comprises a metal box-like base 1, supported on suitable short legs 2, 2, of angle iron or the like, brazed or bolted to the base, and a similar metal top 3 hinged at 4—4 to the base 1. Within the lower portion of the base 1 as well as at the upper portion of the top 3 are heating coils 5—5 and 6—6, respectively, controlled by switches 7 and 8 leading the current from any suitable source of supply, and with both the lower heating coils for the Frankfurt roasting end controlled by the switch 7 in this corresponding portion of both the base 1 and top 3, current-carrying wires 10 uniting the heating elements of this portion at the rear of the hinged part of the base and top. The switch 8 controls the heating elements at the opposite end portion in both the base 1 and top 3 through the wires 12 adjacent the hinged edge or back of the cover. A handle 15 at the front of the cover 3 is also supplied for convenience in raising and lowering.

With the apparatus as thus described and with the heating units fitted in both base and top, I may apply detachable cooking trays as shown in Figs. 2 and 3. These trays may be substantially duplicated in both the top or bottom, although the removal and replacement in the bottom or base portion is usually only required when in use. The tray of Fig. 2 is substantially duplicated in both top and bottom sections when the apparatus is fitted for roasting or toasting Frankfurts and rolls. For this purpose the tray designated at 20 has an inner section 21 divided into a series of Frankfurt-receiving portions, here shown as four, at 22, 22 and a corresponding series of four roll-receiving sections 23, 23 adjacent the opposite end. A substantial space 25 is provided around the entire periphery of the tray between the inner section 21 and the outer tray 20 to accumulate any grease, or the like, which may overflow from the receptacles 22, and thus can be readily removed from the entire apparatus by lifting the tray 20 and inverted and cleaned. Small lugs 26, 26 are provided at each end of the tray 20 for this purpose, which lugs also constitute a rest for the tray holding it above the heating coils 5.

The top tray 30 is identical in construction, arrangement, and extent to cooperate with the bottom tray 20 except that it is provided with perforations 31 at each end which extend also through the adjacent parts of the top 3 in alignment therewith to receive spring-pressed locking plungers 33 to hold the tray in position, these plungers 33 being attached to springs 34 secured to the top 3. Thus the tray 30 may be fitted quickly in position in the top 3 and will be locked therewith as the same is raised and lowered until it is desired to remove the tray 30 for cleaning or replacement.

This tray 30 also has small lugs 36 to facilitate lifting and removing as well as to limit the fitting of the tray within the cover 3.

In the top tray 30 are similar annular spaces 25 to those in the bottom tray 20 and, in fact, these trays may be made interchangeable by the simple addition of the recesses 31 so that either tray may be fitted to the top or cover 3 as well as in the base 1.

Figure 5:
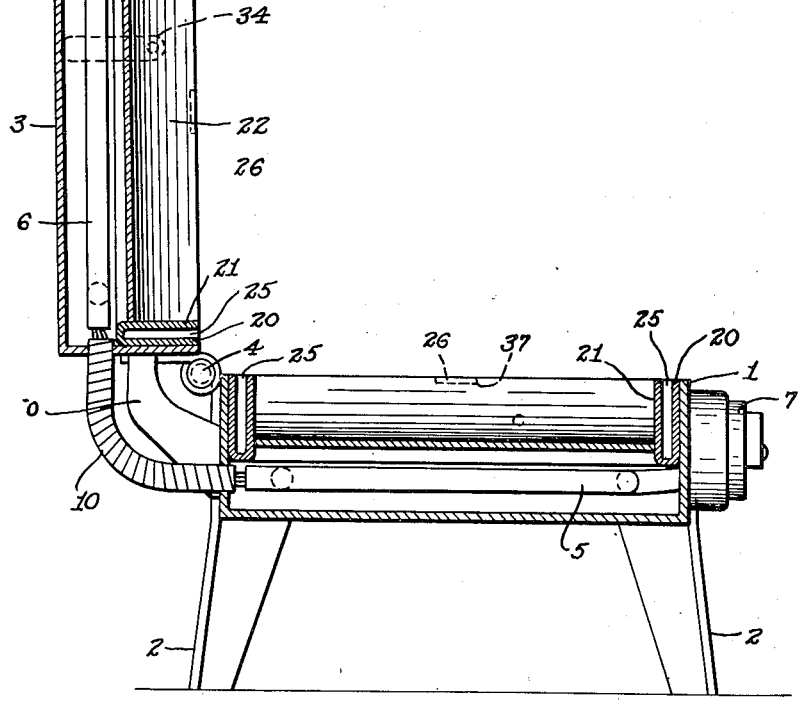
Fig. 5 is a similar cross-sectional view showing the top open.

As it is desirable to have the cover 3 and base 1 fit tight, I provide small notches to receive the lugs 26 and 36, same being shown at 37, Fig. 4, and in dotted lines in Fig. 5.

As shown in Fig. 3 a modified form of tray is illustrated designated at 40 with the inner article-receiving pan 41 preferably also spaced to leave a recess 42 entirely around the same for overflow or collection of grease or the like. Hamburger or meat cakes may be cooked, roasted, etc. in this form of tray and the same may be readily interchangeable with the tray 20.

It will be noted that I have employed separate switches so that if the rolls at one end are ready, the switch 8 can be turned off, while the switch 7 will maintain the heat in the upper and lower toasting receptacles 22 and 23. A stop 50 is provided on which the top may rest when raised.

The entire apparatus may be economically manufactured, is compact, and capable of ready transportation and ready for instant use, is quickly cleaned, and if the trays are burned out they may be quickly replaced. Other trays for special articles may be similarly fitted and with the uniform distribution of heat above and below and, in fact, entirely around the articles contained in the apparatus, quick uniform action is secured with a minimum of time and conserving the electrical current to a much greater degree than has heretofore been possible with other devices of an approximate nature.

I claim:

A rectangular sausage and roll electrical heating apparatus of the kind described, constructed and arranged to heat simultaneously, or selectively, a plurality of rolls and a corresponding plurality of sausages, comprising a base member having electrical heating devices therein, a top member cooperating therewith and having corresponding electrical heating devices cooperating with the base member, a series of cooperating roll-receiving semi-cylindrical recesses in one portion of said top and base members, a corresponding series of different sized semi-cylindrical sausage-receiving recesses in the remaining portion of said top and base members, and means controlling the heat for either sausage cooking, roll cooking, or for cooking both simultaneously.

CHARLES E. KENNEDY.